United States Patent [19]

Hatano et al.

[11] Patent Number: 4,525,824
[45] Date of Patent: Jun. 25, 1985

[54] INFORMATION RECORDING SYSTEM

[75] Inventors: Hideki Hatano; Norikiyo Tajiri; Sakashi Otaki; Shigeru Kato, all of Tokorozawa, Japan

[73] Assignee: Pioneer Electronic Corporation, Tokyo, Japan

[21] Appl. No.: 384,241

[22] Filed: Jun. 2, 1982

[30] Foreign Application Priority Data

Jun. 4, 1981 [JP] Japan ................... 56-086154

[51] Int. Cl.³ .............................................. G11B 7/00
[52] U.S. Cl. .................................................... 369/45
[58] Field of Search ................. 369/45, 110; 250/201; 358/225, 342

[56] References Cited

U.S. PATENT DOCUMENTS 3,969,576  7/1976  Boonstra et al. ................ 369/45

FOREIGN PATENT DOCUMENTS 2652790  6/1977  Fed. Rep. of Germany ........ 369/45

Primary Examiner—Robert L. Richardson
Attorney, Agent, or Firm—Fleit, Jacobson, Cohn & Price

[57] ABSTRACT

Disclosed is an information recording system having a recording light beam passing through a focus lens, and a focus servo mechanism for adjusting the position of the focus lens, characterized by the provision of a bias beam of a weak intensity for producing a continuous control signal for the focus servo mechanism.

4 Claims, 4 Drawing Figures

INFORMATION RECORDING SYSTEM

BACKGROUND OF THE INVENTION

1. Field of the Invention

The present invention relates to an information recording system, and more particularly to a recording system which utilizes a recording medium having a vertical magnetization film on and from which the information is recorded, and having read out by an optical means employing such as a laser beam.

2. Description of the Prior Art

In recent years, recording systems have been proposed within the information is recorded and played back by effectively utilizing the magneto-optical charactetistics of an amorphous (noncrystalline) alloy material which is used as the recording medium.

This is due to the fact that the amorphous alloy thin film, such as GdFe (Gadlinium Iron) or GdCo (Gadlinium Cobalt), is a "vertical magnetization film" in which the direction of magnetization is perpendicular to the surface of the film.

Recording of the information on this amorphous thin film takes place in a manner such that the orientation or the direction of magnetization of the desired portions of the amorphous alloy film which is initially magnetized in a preselected direction is turned over by heating those portions above the Curie temperature or a compensation temperature under the conditions of application of a weak external magnetic field.

More specifically, the amorphous alloy thin film which is previously downwardly (corresponding to the binary "0" signal) magnetized is applied with a weak upward bias magnetic field and only the portions of the thin film on which the "1" signal is to be recorded are applied with the laser beam so as to raise the temperature of those portions above the Curie temperature or a compensation temperature to cause the change in the direction of magnetization.

On the other hand, the reading out of the information recorded on the thin film takes place by utilizing the magnetic Kerr effect which is an interaction between the magnetism of substance and the light beam.

When a linearly polarized laser beam is reflected by the magnetized thin film, the plane of polarization is rotated in a direction determined by the direction of magnetization.

Therefore, the information recorded on the amorphous thin film is read out by detecting the direction of rotation of the plane of polarization of the reflected laser beam by means of an analyzer.

These kind of recording systems, however, have suffered from the problem that a focus lens of the recording laser beam is moved up and down each time the recording is started and stopped. Specifically, these systems include a focus servo mechanism for operating the movement of the focus lens, the servo mechanism being actuated only when a focus servo error signal, obtained upon the presence of the recording laser beam which depends on the recording signal, is present.

SUMMARY OF THE INVENTION

An object of the present invention is therefore to provide an information recording system in which the focus servo mechanism is continuously activated to eliminate unnecessary up and down movement of focus lens when the recording is started or stopped.

According to the present invention, a bias beam having a relatively low energy level which does not turn the magnetization direction of the vertical magnetization film is continuously irradiated so as to produce the focus servo error signal.

According to another aspect of the invention, a read out laser beam of the system is utilized as the bias beam during recording.

The foregoing and other objects and advantages of the invention will become more clearly understood from the following description taken in conjunction with the accompanying drawings.

DETAILED DESCRIPTION OF THE PREFERRED EMBODIMENT

Figure 1:
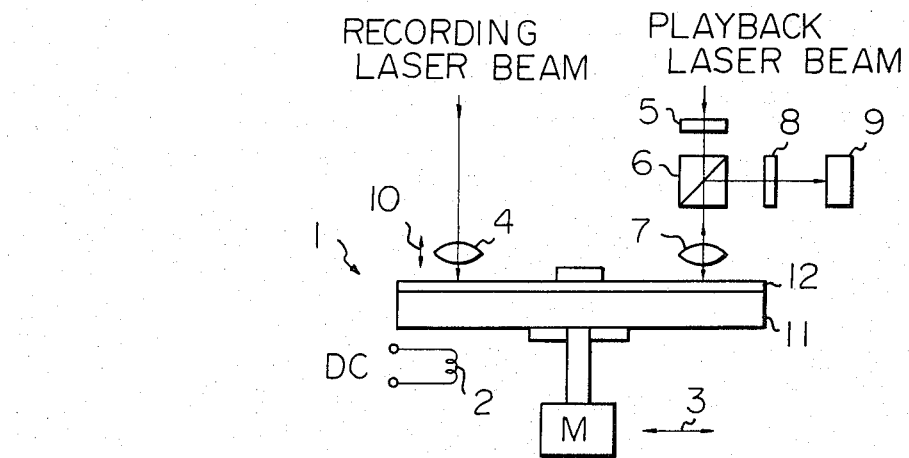
FIG. 1 is a schematic illustration of an example of a prior art record and playback system including a magneto-optical recording medium.

Reference is first made to FIG. 1, in which an example of a prior art recording and playback system is illustrated.

In FIG. 1, there is shown a disc 1 comprising a base 11 of a dielectric material such as glass and an amorphous alloy thin film 12 formed thereon. Disc 1 is driven by a motor M and rotates at a high rotational speed. The thin film 12 is made of a material such as Gadlinium Iron (GdFe) or Gadlinium Cobalt (GdCo) and forms a vertical magnetization film.

In order to record information on disc 1, a recording laser beam is applied and focused on the thin film 12 while a biasing coil 2 is provided at a position beneath the focal point. At the time of recording, the disc 1 is rotated at a high speed by the motor M and slowly is translated along a radial axis thereof as shown by the arrow 3. Rotation and translation occur at the same time.

The recording of information takes place by applying the recording laser beam, which is modulated in accordance with the information to be recorded (not shown), on this rotating disc 1 through a focus lens 4. Another source of laser beam is provided for the purpose of the playback operation.

At the time of playback, the playback laser beam is supplied on the recording surface of the thin film 12 via a polarizer 5, a half prism 6, and a focus lens 7.

More specifically, the recording of information is executed in a manner that a carrier signal is modulated in frequency by a signal corresponding to the information to be recorded, to form an FM signal.

The thus produced FM signal then is translated into a pulse signal, via a limiter circuit, to control the irradiation of the laser beam. In other words, the irradiation of the laser beam is stopped with the pulse signal is at its low level or when the pulse signal is not present. On the other hand, when the pulse signal is at its high level, a laser beam having an intensity sufficient to turn over the magnetization direction of the vertical magnetization film is actuated.

Figure 2A:
FIG. 2A is a diagram showing the power level of the recording laser beam with respect to time, in the case of a prior art recording system.

In FIG. 2A, the energy level of the laser beam with respect to time is illustrated, wherein the duration and the interval of each pulse of the laser beam correspond to the record signal.

As noted previously, the recording laser beam must be correctly focused on the surface of the recording film 12. However, in general, the focusing point which is determined by the lens 4 must be changed in accordance with the warp of the deformation of the disc or the turntable.

In order to change the focusing point, a focus servo mechanism (not shown) is provided to move the lens 4 up and down in a direction perpendicular to the surface of the disc. However, in the case of the recording system shown in FIG. 2A, it is not possible to operate the focus servo mechanism when the recording signal is absent because a focus servo control signal is not produced when the laser beam is not active. Accordingly, the prior art method is to initially position the lens 4 at a reset position which is farthest away from the surface of the disc, and then to move the lens 4 downwardly to a position of recording when the recording is initiated. After that, a focus servo error signal for controlling the focus servo mechanism is produced in accordance with the operation of the laser beam.

In addition, when the recording is terminated, the operation of the focus servo mechanism is stopped and the lens 4 is returned to the reset position. When the recording is started again, the lens 4 is moved downwardly from the reset position to the position of recording, and the focus servo mechanism is again actuated by the initiation of the laser beam. That is, the focus servo mechanism is turned on and off in accordance with the starting and stopping of the recording, and the lens 4 is moved up and down each time the focus servo mechanism starts or stops its operation.

This type of system therefore has suffered from the problems that the start-up time of the focus servo mechanism at the initiation of the recording is rather long, and that the up and down motion of the focus servo mechanism causes wearing of various parts of the system.

Figure 2B:
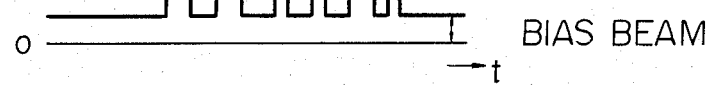
FIG. 2B is a diagram similar to FIG. 2A, showing the power level of the recording laser beam with respect to time, in the case of the present invention.

With reference now to FIG. 2B, the recording system according to the present invention will be explained.

In FIG. 2B, a bias light beam having a constant intensity irrespective of the presence of the recording pulse is added to the modulated light beam. The intensity of the bias light beam is selected so that it does not change the direction of magnetization of the recording film.

With the provision of this bias light beam, the focus servo mechanism can always receive a control signal which is generated from the light beam reflected by the surface of the recording film. Thus, the focusing of the recording laser beam can continually be monitored, and the focus servo mechanism can continually be actuated.

Figure 3:
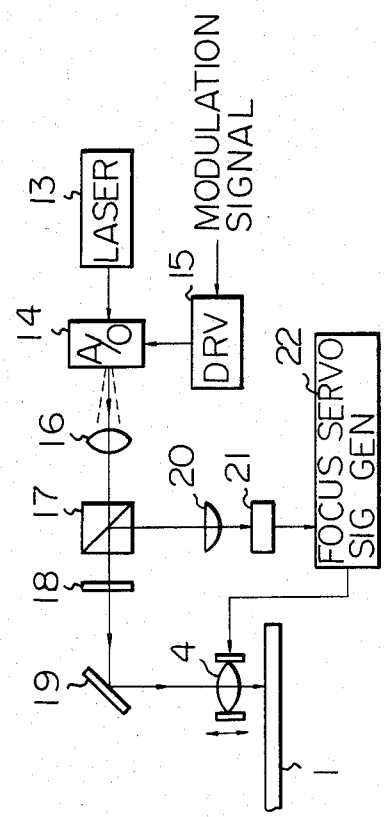
FIG. 3 is a schematic illustration of an embodiment of the recording system according to the present invention.

Reference now is made to FIG. 3 in which a specific embodiment of the recording system according to the present invention is illustrated.

In FIG. 3, a laser beam emits from a light source 13 and is fed into an A/O (Acoustic/Optical) modulator 14 where the laser beam is modulated by an output signal of a driver circuit 15 which receives a modulation signal to develop an output laser beam of pulse format. A zero order output light (the low level bias beam) thus produced by the A/O modulator 14 then is transmitted to the focus lens 4 via a diffusion lens 6, beam splitter 17, $\lambda/4$ plate 18 and mirror 19.

The beam from the lens 14 is thus focused on the surface of the recording disc. The beam then is reflected by the surface of the disc and is returned to the beam splitter 17, passing through the axis of the original beam. The reflected beam is changed in direction at the beam splitter 17, and finally is received by a light detector 21 through a tubular lens 20.

Since the amount of the reflected beam received by the light detector 21 corresponds to a focusing error, i.e., the distance between the focal point of the focus lens 4 and the surface of the recording disc 1, an output signal of the light detector 21 is applied to a focus servo signal generator circuit 22 to form a focus servo signal for controlling the up and down motion of the lens 4. The portions of the system for driving lens 4 are conventional, and will not be described herein.

Differing from the prior art system in which the A/O modulator provides no output unless the laser beam is in its "full-on" state, a continuous bias beam is provided in the inventive system without employing any additional elements.

The recording light beam as shown in FIG. 2B can be produced by using the first order output signal of the A/O modulator 14 and adding a bias signal to the output signal of the driver circuit 15.

Furthermore, when the present invention is adapted in a recording system having respective light sources for the recording laser beam and the read out laser beam, the read out laser beam can be used as a bias beam during recording since the intensity of the read out laser beam is not strong enough to change the magnetization direction of the recording film.

As described in the above, the operation of the focus servo mechanism is maintained quite simply and the disadvantageous of the prior art system, such as the existence of delay at the start of recording, and the unnecessary up and down movement of the focus lens, are eliminated by means of the present invention.

Above, preferred embodiments of the present invention have been described. It should be understood, however, that the foregoing description has been for illustrative purposes only, and is not intended to limit the scope of the invention. Rather, there are numerous equivalents to the preferred embodiments, and such are intended to be covered by the appended claims. As only one of may examples, the amorphous alloy used as the material of the thin film may be replaced by a polycrystalline material such as Manganese Bismuth (MnBi).

What is claimed is:

1. An information recording system utilizing a recording medium having a vertical magnetization film on and from which the information is recorded and played back, respectively comprising:
  (a) a source of recording light beam;
  (b) a modulator for modulating said recording light beam in accordance with a signal representing the information to be recorded, to form sequences of pulses of said recording light beam which carries said information:
  (c) an optical transmission means including a focus lens, for focusing said recording light beam on the surface of the vertical magnetization film;
  (d) a focus servomechanism for adjusting the postion of said focus lens in accordance with a control signal;
  (e) a bias-beam means for continuously applying a bias beam having a power level which does not change the direction of magnetization of the vertical magnetization film to the surface of the magnetization film; and, (f) means for producing said control signal based upon the reflection of said bias beam from said magnetization film.

2. An information recording system as claimed in claim 1, wherein said bias-beam means applies a zero-order output beam to said modulator, which has a light component of a constant intensity usable as a bias beam, which is utilized along with a recording light beam.

3. An information recording system as claimed in claim 1, wherein said bias-beam means includes a light source used solely for the read out of information from said magnetization film and a read beam from said light source used solely for the readout of information which is applied as the bias beam.

4. An information recording system utilizing a recording medium having a vertical magnetization film, on and from which the information is recorded and played back, respectively comprising:

(a) a source of recording light beam;
(b) a modulator for modulating said recording light beam to form a a sequence of pulses of said recording light beam which carries said information;
(c) a controller for controlling the operation of said modulator in accordance with a signal representing the information to be recorded;
(d) a first optical transmission means for introducing said sequence of pulses of recording light beam;
(e) an objective lens movably disposed in said first optical transmission means for focusing said recording light beam on the surface of the vertical magnetization film;
(f) a drive mechanism means for adjusting the position said objective lens in accordance with a focus servo signal;
(g) means for sensing the reflection beam of said recording light beam reflected by the surface of the vertical magnetization film;
(h) a second optical transmission means for introducing said reflection beam on the surface of said vertical magnetization film; and
(i) a focus servo controller means for producing said focus servo signal from the output signal of said sensing means so as to adjust the position of said focus lens and focus said recording light beam on the surface of said vertical magnetization film; and
(j) means for continuously applying a bias beam having an intensity which does not change the magnetization direction of the vertical magnetization film along with said recording light beam so that said focus servo controller is always in operation.

* * * * *